(12) United States Patent
Liu

(10) Patent No.: US 11,923,701 B2
(45) Date of Patent: Mar. 5, 2024

(54) METHOD FOR TRANSMITTING INFORMATION, DEVICE AND STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 296 days.

(21) Appl. No.: 17/601,572

(22) PCT Filed: Apr. 9, 2019

(86) PCT No.: PCT/CN2019/081950
§ 371 (c)(1),
(2) Date: Oct. 5, 2021

(87) PCT Pub. No.: WO2020/206614
PCT Pub. Date: Oct. 15, 2020

(65) Prior Publication Data
US 2022/0166262 A1    May 26, 2022

(51) Int. Cl.
*H02J 50/80*        (2016.01)
*H02J 50/20*        (2016.01)
*H04W 12/03*        (2021.01)
*H04W 12/06*        (2021.01)
*H04W 76/28*        (2018.01)

(52) U.S. Cl.
CPC .......... *H02J 50/80* (2016.02); *H04W 12/03* (2021.01); *H04W 12/06* (2013.01); *H04W 76/28* (2018.02)

(58) Field of Classification Search
None
See application file for complete search history.

(56) References Cited

U.S. PATENT DOCUMENTS

| | | | |
|---|---|---|---|
| 8,577,479 B2 * | 11/2013 | Wakamatsu | G06F 1/3203 307/64 |
| 8,798,537 B2 * | 8/2014 | Lee | H02J 50/80 455/343.1 |
| 9,306,636 B2 * | 4/2016 | Kwon | H04B 5/0037 |
| 9,472,983 B2 * | 10/2016 | Lee | H02J 50/40 |
| 9,543,766 B2 * | 1/2017 | Kim | H02J 50/12 |
| 9,666,359 B2 * | 5/2017 | Ichikawa | H02J 50/12 |
| 9,887,554 B2 * | 2/2018 | Takahashi | B60L 53/65 |
| 9,973,239 B2 * | 5/2018 | Liu | H02J 50/80 |
| 9,985,477 B2 * | 5/2018 | Nagamine | H02J 50/90 |
| 10,418,856 B2 * | 9/2019 | Adolf | H02J 50/40 |
| 10,790,701 B2 * | 9/2020 | Lee | H02J 50/12 |

(Continued)

FOREIGN PATENT DOCUMENTS

CN        104769812 A        7/2015

OTHER PUBLICATIONS

PCT/CN2019/081950 English translation of the International Search Report dated Jan. 8, 2020, 2 pages.

*Primary Examiner* — Tuan A Tran
(74) *Attorney, Agent, or Firm* — COZEN O'CONNOR

(57) ABSTRACT

A method for transmitting information includes transmitting a broadcast message in a manner of out-of-band communication by a first power transmitting device. The broadcast message is configured to indicate related information of a first power transmitting device to a power receiving device and/or other power transmitting devices.

18 Claims, 3 Drawing Sheets

(56) References Cited

U.S. PATENT DOCUMENTS

| | | | |
|---|---|---|---|
| 11,056,932 B2 * | 7/2021 | Park | H02J 50/80 |
| 11,228,206 B2 * | 1/2022 | Lee | H04B 5/0037 |
| 11,316,377 B2 * | 4/2022 | Zeine | H02J 50/20 |
| 11,664,688 B2 * | 5/2023 | Park | H02J 50/12 |
| | | | 307/104 |
| 2018/0091002 A1 * | 3/2018 | Park | H02J 50/20 |
| 2018/0145544 A1 * | 5/2018 | Park | H02J 50/40 |
| 2019/0148966 A1 * | 5/2019 | Choi | H02J 50/80 |
| | | | 307/104 |
| 2019/0235041 A1 * | 8/2019 | Lee | H02J 7/02 |

* cited by examiner

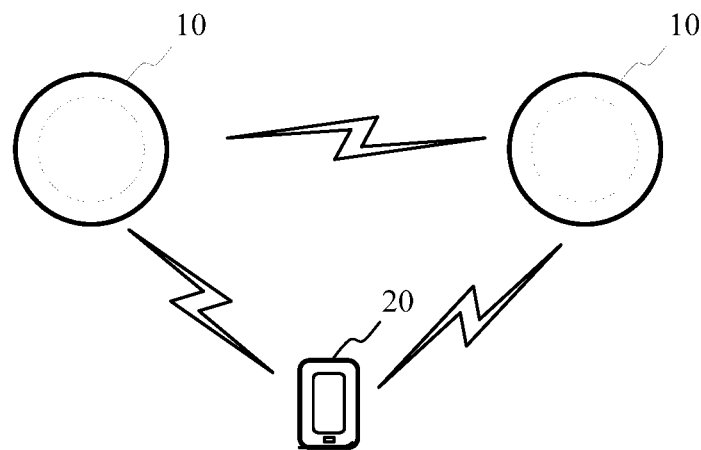
FIG. 1
transmitting a broadcast message in a manner of out-of-band communication by a first power transmitting device for wireless charging — 201
FIG. 2
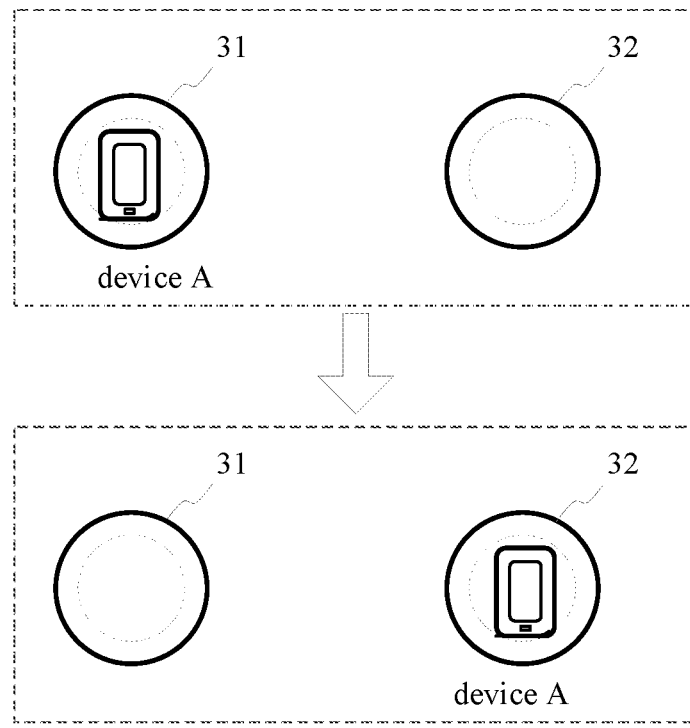
FIG. 3

METHOD FOR TRANSMITTING INFORMATION, DEVICE AND STORAGE MEDIUM

CROSS-REFERENCE TO RELATED APPLICATION

The present application is a National stage of International Patent Application No. PCT/CN2019/081950, filed on Apr. 9, 2019, the disclosure of which is incorporated herein by reference in its entirety.

TECHNICAL FIELD

This disclosure relates to a field of wireless charging technologies, and particularly to a method and an apparatus for transmitting information, and a storage medium.

BACKGROUND

At present, certain mobile phones support wireless charging. Wireless charging is typically conducted in an electromagnetic induction manner, an electromagnetic resonance manner, an electric field coupling manner, or a radio wave manner, etc.

The wireless power standard proposed by the Wireless Power Consortium (WPC) provides that necessary communication between a charger and a charged device supporting the wireless charging can be performed based on a working frequency band of the wireless charging. The working frequency band of the wireless charging is typically a narrow band around 124 kHz.

SUMMARY

In one embodiment, a method for transmitting information is provided. The method includes: transmitting, by a first power transmitting device for wireless charging, a broadcast message in a manner of out-of-band communication; the broadcast message being configured to indicate related information of the first power transmitting device for a power receiving device and/or other power transmitting devices.

In one embodiment, a device for transmitting information is provided. The device has an application in a first power transmitting power, and the first power transmitting power is a device for wireless charging. The device includes: a processor; a memory for storing instructions executable by the processor; the processor being configured to: transmit a broadcast message in a manner of out-of-band communication; the broadcast message being configured to indicate related information of the first power transmitting device to a power receiving device and/or other power transmitting devices.

In one embodiment, a non-transitory computer readable storage medium stored with computer programs thereon is provided, in which the computer programs implement blocks of the method provided in the first aspect of the disclosure when executed by the processor.

It should be noted that, the details above and in the following are exemplary and illustrative, and do not constitute the limitation on the disclosure.

BRIEF DESCRIPTION OF THE DRAWINGS

The drawings herein are incorporated into the specification and constitute a part of the specification, show embodiments in conformity with embodiments of the disclosure, and explain the principle of the disclosure together with the specification.

FIG. 1 is a schematic diagram illustrating an application scenario of wireless charging according to an embodiment;

FIG. 2 is a flowchart illustrating a method for transmitting information according to an embodiment;

FIG. 3 is a schematic diagram illustrating that a power receiving device moves from a power transmitting device to another power transmitting device;

DETAILED DESCRIPTION

Figure 4:
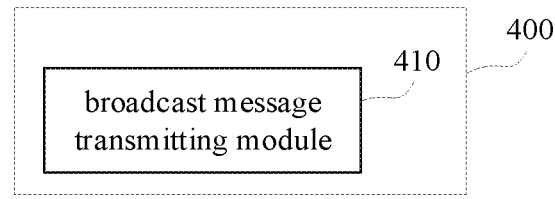
FIG. 4 is a block diagram illustrating an apparatus for transmitting information according to an embodiment.

Embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the disclosure. Rather, they are merely examples of the apparatus and method consistent with some aspects of the disclosure as detailed in the appended claims.

The application scenario described in embodiments of the disclosure is intended to explain the technical solutions of embodiments of the disclosure clearly and does not constitute a limitation to the technical solutions according to embodiments of the disclosure. Those skilled in the art will understand that, with the evolution of technologies and the emergence of new scenarios, the technical solutions according to embodiments of the disclosure are also applicable to similar technical problems.

At present, a working frequency band of wireless charging is relatively narrow. As a result, the amount of information carried by the communication based on the working frequency band is limited, and more communication requirements may not be met. To address these issues, a method and an apparatus for transmitting information, a device and a non-transitory computer readable storage medium are provided herein.

FIG. 1 is a schematic diagram illustrating an application scenario of wireless charging according to an example embodiment. The application scenario may include a power transmitting device 10 and a power receiving device 20.

The power transmitting device 10 refers to a device configured to supply power to electrical equipment in the wireless charging. In different application scenarios, the name of the power transmitting device 10 may be different. For example, when the power transmitting device 10 is a device for performing the wireless charging on a portable electronic device such as a mobile phone, a tablet computer, a wearable device. The power transmitting device 10 may be called a charger, a charging plate, a power adapter, a wireless charger, etc. As another example, when the power transmitting device 10 is a device for performing the wireless charging on a transport tool such as an electric vehicle, the power transmitting device 10 may be called a charging station, a wireless charging station, etc.

The power receiving device 20 refers to a device configured to receive power in the wireless charging, i.e., electrical equipment. The power receiving device 20 may be any kind of electrical equipment supporting the wireless charging, such as a mobile phone, a tablet computer, a wearable device, an electric vehicle, etc., which is not limited here.

In an example embodiment, there are a number of power transmitting devices 10, for example, including the first power transmitting device and other power transmitting devices. The first power transmitting device may be any one of the power transmitting devices, and the other power transmitting devices refer to any one or more of the remaining power transmitting devices other than the first power transmitting device. There may be one or more power receiving devices 20. Any one of the power receiving devices 20 may perform a switch between different power transmitting devices 10. For example, a certain power receiving device 20 is wirelessly charged by the first power transmitting device over a period of time and wirelessly charged by another power transmitting device over another period of time.

FIG. 2 is a flowchart illustrating a method for transmitting information according to an example embodiment. The method may include the following.

At block 201, a first power transmitting device for wireless charging transmits a broadcast message in a manner of out-of-band communication.

The first power transmitting device may be any kind of power transmitting device for the wireless charging, for example, a charger for wirelessly charging a mobile phone. Transmitting by the first power transmitting device the broadcast message in the manner of out-of-band communication refers to that the first power transmitting device transmits the broadcast message within a non-working frequency band of the wireless charging rather than a working frequency band of the wireless charging. Since the working frequency band of the wireless charging is relatively narrow and the amount of information amount carried by the communication based on the working frequency band is limited, the manner of out-of-band communication is adopted to transmit the broadcast message within the non-working frequency band to allow more amount of information to be carried by the broadcast message. In addition, the broadcast message is transmitted in the form of broadcasting, and one or more devices around the first power transmitting device may receive the broadcast message.

In embodiments of the disclosure, the broadcast message is configured to indicate related information of the first power transmitting device for a power receiving device and/or other power transmitting devices. The power receiving device and/or other power transmitting devices around the first power transmitting device may receive the broadcast message transmitted by the first power transmitting device and obtain the related information of the first power transmitting device from the broadcast message.

The related information of the first power transmitting device may be any information related with the first power transmitting device. In an example, the broadcast message transmitted by the first power transmitting device includes a device identifier of the first power transmitting device. The device identifier of the first power transmitting device is configured to uniquely indicate the first power transmitting device. Different power transmitting devices have different device identifiers. By carrying the device identifier of the first power transmitting device in the broadcast message transmitted by the first power transmitting device, other devices receiving the broadcast message may obtain the transmitter of the broadcast information.

In at least one embodiment, the broadcast message transmitted by the first power transmitting device further includes: a respective device identifier of at least one target power receiving device. The target power receiving device refers to a power receiving device that is being charged by the first power transmitting device. The first power transmitting device may wirelessly charge one or more power receiving devices simultaneously. The device identifier of the target power receiving device is configured to uniquely indicate the target power receiving device. Different power receiving devices have different device identifiers. By carrying the device identifier of the target power receiving device in the broadcast message transmitted by the first power transmitting device, other devices receiving the broadcast message may obtain that which power receiving device(s) is/are being wirelessly charged by the first power transmitting device.

In an example, as illustrated in FIG. 3, a certain power receiving device (denoted as "device A") is being wirelessly charged by the first power transmitting device 31. After a period of time, the device A is moved to place on a second power transmitting device 32 for the wireless charging. The second power transmitting device 32 is another power transmitting device different from the first power transmitting device 31. Based on the obtained device identifier of the currently coupled device A and in combination with the broadcast message transmitted by the first power transmitting device 31, the second power transmitting device 32 may determine that the currently coupled device A is moved from the first power transmitting device 31 to here (i.e., the second power transmitting device 32) for charging. Therefore, rapid identification of the power receiving device is realized after replacing the power transmitting device.

In at least one embodiment, the broadcast message transmitted by the first power transmitting device further includes: encrypted authentication information corresponding to the target power receiving device. The encrypted authentication information is configured to perform an identity authentication on the target power receiving device. Before wirelessly charging a power receiving device by a power transmitting device, the power transmitting device may perform the identity authentication on the power receiving device. After confirming that the identity authentication of the power receiving device passes, the power transmitting device wirelessly charges the power receiving device, to enhance security of the wireless charging.

In combination with FIG. 3, in a case where the device A moves from the first power transmitting device 31 to the second power transmitting device 32, the second power transmitting device 32 may determine, based on the encrypted authentication information corresponding to the device A carried in the broadcast message transmitted by the first power transmitting device 31, whether there is a need to perform the identity authentication on the device A. For example, in cases where the second power transmitting device 32 may successfully decrypt the encrypted authentication information corresponding to the device A, the second power transmitting device 32 may not perform the identity authentication on the device A or may execute a simplified identity verification process (rather than a standard identity verification process) before wirelessly charging the device A, to improve the efficiency of the wireless charging.

In at least one embodiment, the broadcast message transmitted by the first power transmitting device further includes charging state information corresponding to the target power receiving device, where the charging state information is with a timestamp. The charging state information includes but not limited to at least one of a charging voltage, a charging current and a charging power. The timestamp carried by the charging state information may refer to a moment of obtaining the charging state information or a moment of transmitting the charging state information, which is not limited here.

In combination with FIG. 3, in a case where the device A moves from the first power transmitting device 31 to the second power transmitting device 32, the second power transmitting device 32 may determine, based on the charging state information corresponding to the device A, where the charging state information carries the timestamp and is carried in the broadcast message transmitted by the first power transmitting device 31, whether to continue charging the device A. For example, in cases that the second power transmitting device 32 finds that a time interval between the timestamp in the latest obtained charging state information corresponding to the device A and the timestamp obtained when the device A moves to the second power transmitting device 32 is less than or equal to a preset duration, it is determined to continue charging the device A. For example, the device A is charged based on the charging voltage, charging current or charging power indicated by the latest obtained charging state information corresponding to the power receiving device. In cases that the above time interval is greater than the preset duration, it is determined not to continue charging the device A and a charging initialization process is re-executed. The preset duration may be preset based on actual application scenarios, which is not limited here.

In at least one embodiment, the broadcast message transmitted by the first power transmitting device further includes DTX information. The DTX information is configured to indicate a DTX period and a transmission duration corresponding to the out-of-band communication. It is possible that the out-of-band communication is not performed all the time. Discontinuous out-of-band communication is beneficial to saving power for both communication sides. After introducing the discontinuous communication, the broadcast message transmitted by the first power transmitting device may further include the DTX information, such as the DTX period and the transmission duration. The DTX period corresponding to the out-of-band communication refers to a time interval between two adjacent out-of-band communications. The transmission duration corresponding to the out-of-band communication refers to a duration of each out-of-band communication. By carrying the DTX information in the broadcast message transmitted by the first power transmitting device, other devices receiving the broadcast message may obtain the DTX period and the transmission duration corresponding to the out-of-band communication of the first power transmitting device to receive information of the out-of-band communication transmitted by the first power transmitting device at exact time.

In at least one embodiment, the broadcast message transmitted by the first power transmitting device further includes one or more additional bits. The additional bits refer to a field kept for subsequent function extension, to update functions.

In an example, the content of the broadcast message may be illustrated as Table-1.

TABLE 1

| PTx ID | DTX information | PRx ID1 | encrypted authentication information | charging state information with a timestamp | additional bits |
| --- | --- | --- | --- | --- | --- |
| | | PRx ID2 | encrypted authentication information | charging state information with a timestamp | |

In Table-1, PTx ID represents the device identifier of the power transmitting device that transmits the broadcast message. PRx ID1 represents the device identifier of a power receiving device that is being charged by the power transmitting device. PRx ID2 represents the device identifier of another power receiving device that is being charged by the power transmitting device. The contents of other fields may be understood in combination with the description above, which is not repeated here.

In addition, the moment of transmitting the broadcast message by the first power transmitting device includes following two cases.

1. The first power transmitting device periodically transmits the broadcast message in the manner of out-of-band communication.

2. The first power transmitting device transmits the broadcast message in the manner of out-of-band communication in response to detecting a target event.

"Periodically transmits" refers to transmitting the broadcast message at a certain interval. The interval may be preset based on actual application scenarios, which is not limited here. The target event may be any one or more preset events. For example, the target event includes but not limited to at least one of: that a power receiving device is coupled, a power receiving device is decoupled, a power transmitting device is powered on. The first power transmitting device may transmit the broadcast message in any one or both the above manners, which is not limited here.

In addition, when the first power transmitting device performs the out-of-band communication, the adopted wireless communication technology may be the bluetooth low energy (BLE), the near field communication (NFC), or other near field and low energy wireless communication technologies, which is not limited here.

In conclusion, in technical solutions according to embodiments of the disclosure, the broadcast message is transmitted by the power transmitting device in the manner of out-of-band communication. The problem that the amount of information carried by the communication based on the working frequency band is limited since the working frequency band is relatively narrow can be solved. By transmitting the broadcast message within a non-working frequency band in the manner of out-of-band communication, functions of the out-of-band communication are achieved between the power transmitting devices as well as between the power transmitting devices and the power receiving devices. More amount of information can be carried in the broadcast message, and more functions may be achieved in application scenarios of the wireless charging.

In addition, in a case where the power receiving device moves from the first power transmitting device to the second power transmitting device, on one hand, the broadcast message transmitted by the first power transmitting device may carry the encrypted authentication information corresponding to the power receiving device that is being charged, such that the second power transmitting device determines whether it is possible to omit the identity verification process or execute a simplified identity verification process of the power receiving device to improve the efficiency of the charging. On the other hand, the broadcast message transmitted by the first power transmitting device may carry the charging state information corresponding to the power receiving device that is being charged, where the charging state information carries the timestamp, such that the second power transmitting device may determine whether to continue charging the power receiving device, to omit the charging initialization process and improve the efficiency of the charging.

In an example application scenario, there are a number of wireless chargers at different positions of the user's home or office. When a charged device (such as a mobile phone) is moved from one charger to another one, based on related technical solutions, there is a need to perform a handshake connection through the in-band communication between the other charger and the charged device. In this case, the charging speed may be reduced and the efficiency may be reduced due to the movement. With the technical solutions according to embodiments of the disclosure, the other charger may rapidly identify the charged device and continue charging the charged device, to improve the efficiency of the charging.

In addition, after the out-of-band communication is introduced, the power transmitting device may be smarter, for example, supporting certain applications. As an example, the power transmitting device may exchange information with the charged device while the power transmitting device is charging the charged device, to implement more function extensions.

In an example embodiment, multiple power transmitting devices can be mutually added to the trusted group. Taking the first power transmitting device as a host device, the first power transmitting device performs the authentication on the second power transmitting device. After the authentication of the second power transmitting device passes, the first power transmitting device adds the second power transmitting device to the trusted group, where the trusted group includes at least one power transmitting device. The second power transmitting device may be any one of the power transmitting devices within a communication range of the first power transmitting device. For example, after the second power transmitting device is added to the trusted group, the trusted group includes the first power transmitting device and the second power transmitting device, and in some examples, the trusted group further includes at least one another power transmitting device whose authentication passes.

In at least one embodiment, the first power transmitting device transmits broadcast configuration information to a power transmitting device in the trusted group. The broadcast configuration information being configured to indicate a moment of transmitting the broadcast message. For example, the broadcast configuration information includes but not limited to at least one of transmission period, transmission time and update period. The transmission period of the broadcast message is configured to indicate an interval of transmitting the broadcast message, the transmission time of the broadcast message is configured to indicate when to transmit the broadcast message, and the update period of the broadcast message is configured to indicate an interval of updating the broadcast message. That is, the host device in the trusted group may configure a respective moment of transmitting the broadcast message by each power transmitting device in the trusted group to implement unified scheduling of the moments of transmitting the broadcast message by the devices in the trusted group.

In at least one embodiment, the first power transmitting device removes the third power transmitting device from the trusted group after detecting that the third power transmitting device in the trusted group is powered down. The third power transmitting device may be any one of the power transmitting devices in the trusted group other than the first power transmitting device in the trusted group. In addition, the third power transmitting device may ask for permission from the first power transmitting device to join in the trusted group after the third power transmitting device is powered on again. For example, the first power transmitting device receives a group-joining request transmitted by the third power transmitting device after the third power transmitting device is powered on again. The first power transmitting device performs the authentication on the third power transmitting device. After the authentication of the third power transmitting device passes, the first power transmitting device adds the third power transmitting device to the trusted group. In a case that the third power transmitting device requests to join again in the trusted group, the first power transmitting device needs to perform the authentication again on the third power transmitting device to ensure security.

In addition, since the first power transmitting device is the host device of the trusted group, when the first power transmitting device is powered down, the trusted group is invalid.

In conclusion, in technical solutions according to embodiments of the disclosure, by establishing the trusted group among multiple power transmitting devices, the multiple power transmitting devices in the same trusted group are mutually trusted. When the power receiving device moves between the trusted devices, the authentication process may be simplified and/or the charging is continued to improve the efficiency of the charging.

Embodiments of the disclosure related to the apparatuses will be described below, where the apparatuses may be configured to execute method embodiments of the disclosure. The details that are not disclosed in these embodiments of the disclosure may refer to the descriptions of the embodiments of the disclosure related to the methods.

FIG. 4 is a block diagram illustrating an apparatus for transmitting information according to an example embodiment. The apparatus has a function for implementing the above method examples, and the function may be achieved by a hardware or through executing corresponding software by a hardware. The apparatus may be the above-mentioned first power transmitting device or may be arranged in the first power transmitting device. As illustrated in FIG. 4, the apparatus 400 may include a broadcast message transmitting module 410.

The broadcast message transmitting module 410 is configured to transmit a broadcast message in a manner of out-of-band communication.

The broadcast message is configured to indicate related information of the first power transmitting device to a power receiving device and/or other power transmitting devices.

In conclusion, in the technical solutions according to embodiments of the disclosure, the broadcast message is transmitted by the power transmitting device in the manner of out-of-band communication. A problem that the amount of information carried by the communication based on the working frequency band is limited since the working frequency band is relatively narrow can be solved. By transmitting the broadcast message within a non-working frequency band in the manner of out-of-band communication, functions of the out-of-band communication are achieved between the power transmitting devices as well as between the power transmitting devices and the power receiving devices. More amount of information can be carried in the broadcast message, and more functions may be achieved in application scenarios of the wireless charging.

In an example embodiment, the broadcast message includes a device identifier of the first power transmitting device and a respective device identifier of at least one target power receiving device. The target power receiving device refers to a power receiving device that is being charged by the first power transmitting device.

In an example embodiment, the broadcast message further includes: encrypted authentication information corresponding to the target power receiving device. The encrypted authentication information is configured to perform an identity authentication on the target power receiving device.

In an example embodiment, the broadcast message further includes charging state information corresponding to the target power receiving device, where the charging state information is with a timestamp.

In an example embodiment, the broadcast message further includes: DTX information. The DTX information is configured to indicate a DTX period and a transmission duration corresponding to the out-of-band communication.

Figure 5:
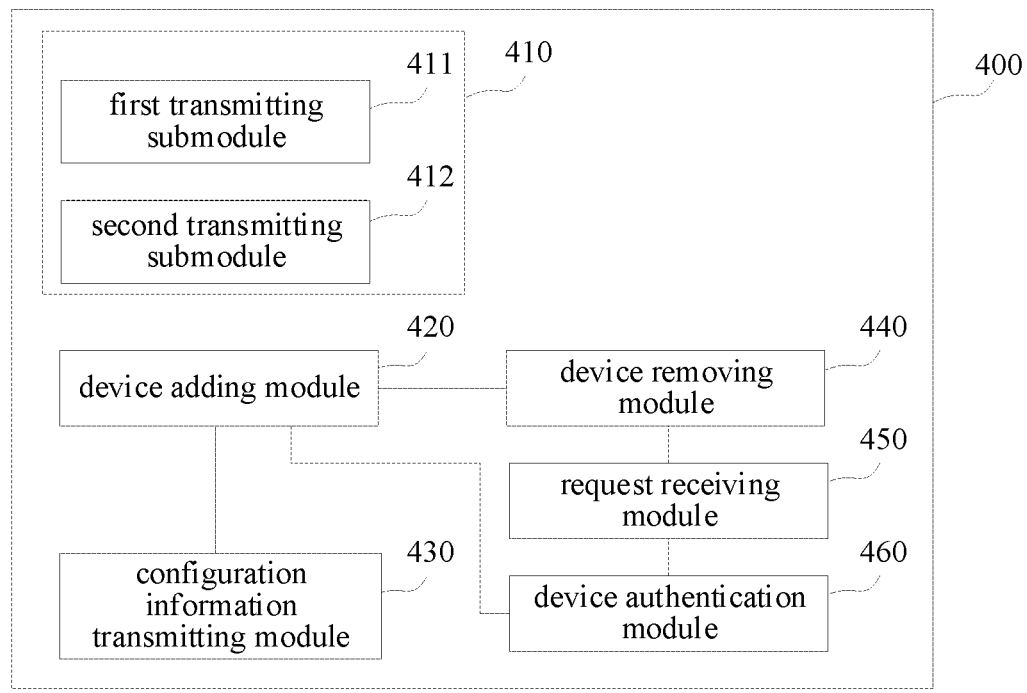
FIG. 5 is a block diagram illustrating an apparatus for transmitting information according to another embodiment.

In an example embodiment, as illustrated in FIG. 5, the broadcast message transmitting module 410 includes: a first transmitting submodule 411 and/or a second transmitting submodule 412. The first transmitting submodule 411 is configured to periodically transmit the broadcast message in the manner of out-of-band communication. The second transmitting submodule 412 is configured to transmit the broadcast message in the manner of out-of-band communication in response to detecting a target event.

In an example embodiment, as illustrated in FIG. 5, the apparatus 400 further includes: a device adding module 420. The device adding module 420 is configured to perform an authentication on a second power transmitting device and add the second power transmitting device into a trusted group after the authentication of the second power transmitting device passes. The trusted group includes at least one power transmitting device.

In an example embodiment, as illustrated in FIG. 5, the apparatus 400 further includes: a configuration information transmitting module 430. The configuration information transmitting module 430 is configured to transmit broadcast configuration information to power transmitting devices in the trusted group. The broadcast configuration information is configured to indicate a moment of transmitting the broadcast message.

In an example embodiment, as illustrated in FIG. 5, the apparatus 400 further includes: a device removing module 440. The device removing module 440 is configured to remove the third power transmitting device from the trusted group after detecting that the third power transmitting device in the trusted group is powered down.

In an example embodiment, as illustrated in FIG. 5, the apparatus 400 further includes: a request receiving module 450 and a device authentication module 460.

The request receiving module 450 is configured to receive a group-joining request transmitted by the third power transmitting device after the third power transmitting device is powered on again.

The device authentication module 460 is configured to perform the authentication on the third power transmitting device.

The device adding module 420 is further configured to add the third power transmitting device to the trusted group again after the authentication of the third power transmitting device passes.

It should be noted that, when the apparatuses according to the above embodiments execute their functions, only the division of the above function modules is given as an example. In practical applications, the above functional allocation may be completed by different function modules according to actual requirements, that is, the content structure of the apparatus is divided into different function modules to complete all or part of functions described above.

With regard to the apparatus in the above embodiments, the detailed way in which each module performs the operation has been described in detail in the embodiments related to the method and will not be elaborated here.

One example embodiment of the disclosure further provides a device for transmitting information. The device may be applied to the above-mentioned terminal to implement the method for transmitting information according to the disclosure. The device may include a processor and a memory for storing instructions executable by the processor. The processor is configured to: transmit a broadcast message in a manner of out-of-band communication. The broadcast message is configured to indicate related information of the first power transmitting device to a power receiving device and/or other power transmitting devices.

In an example embodiment, the broadcast message includes a device identifier of the first power transmitting device and a respective device identifier of at least one target power receiving device. The target power receiving device refers to a power receiving device that is being charged by the first power transmitting device.

In an example embodiment, the broadcast message further includes: encrypted authentication information corresponding to the target power receiving device. The encrypted authentication information is configured to perform an identity authentication on the target power receiving device.

In an example embodiment, the broadcast message further includes charging state information corresponding to the target power receiving device, where the charging state information is with a timestamp.

In an example embodiment, the broadcast message further includes: DTX information. The DTX information is configured to indicate a DTX period and a transmission duration corresponding to the out-of-band communication.

In an example embodiment, the processor is configured to: periodically transmit the broadcast message in the manner of out-of-band communication; and/or transmit the broadcast message in the manner of out-of-band communication in response to detecting a target event.

In an example embodiment, the processor is further configured to: perform an authentication on a second power transmitting device and add the second power transmitting device into a trusted group after the authentication of the second power transmitting device passes. The trusted group includes at least one power transmitting device.

In an example embodiment, the processor is further configured to: transmit broadcast configuration information to power transmitting devices in the trusted group. The broadcast configuration information is configured to indicate a moment of transmitting the broadcast message.

In an example embodiment, the processor is further configured to: remove the third power transmitting device from the trusted group after detecting the third power transmitting device in the trusted group is powered down.

In an example embodiment, the processor is further configured to: receive a group-joining request transmitted by the third power transmitting device after the third power transmitting device is powered on again; perform an authentication on the third power transmitting device; add the third power transmitting device to the trusted group again after the authentication of the third power transmitting device passes.

Figure 6:
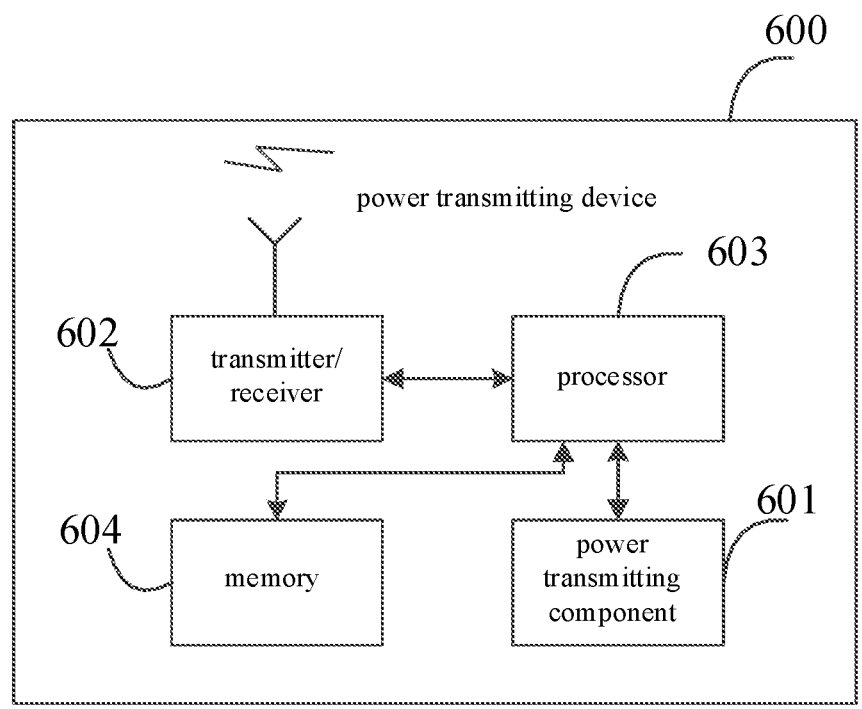
FIG. 6 is a schematic diagram illustrating a structure of a power transmitting device according to an embodiment.

FIG. 6 is a schematic diagram illustrating a structure of a power transmitting device according to an example embodiment. A power transmitting device 600 includes a power transmitting component 601, a transmitter/receiver 602 and a processor 603.

The power transmitting component 601 is configured to wirelessly charge a power receiving device. Since the wireless charging includes an electromagnetic induction manner, an electromagnetic resonance manner, an electric field coupling manner, and a radio wave manner, constituents and structures of the power transmitting component 601 adopted by different manners of the wireless charging may be different. In embodiments of the disclosure, the constituents and structures of the power transmitting component 601 are not limited.

The transmitter/receiver 602 is configured to support communication between the power transmitting device 600 and other devices (such as a power receiving device and/or other power transmitting devices).

The processor 603 is configured to control and manage actions of the power transmitting device 600 to execute the processing procedure executed by the power transmitting device 600 in the above embodiments of the disclosure. For example, the processor 603 is further configured to execute various blocks in the above method embodiments, and/or other blocks of the technical solutions described in embodiments of the disclosure.

Further, the power transmitting device 600 may further include a memory 604. The memory 604 is configured to store program codes and data used for the power transmitting device 600.

It is understandable that, FIG. 6 only illustrates a simplified design of the power transmitting device 600. In actual applications, the power transmitting device 600 may include more or less components, and all devices that can implement the power transmitting device according to embodiments of the disclosure are within the protection scope of embodiments of the disclosure.

The embodiments of the disclosure further include a non-transitory computer readable storage medium with computer programs stored thereon. When the computer programs are executed by the processor of the power transmitting device, the above method for transmitting information is executed.

In at least one embodiment, the non-transitory computer readable storage medium may be a read-only memory (ROM), a random access memory (RAM), a CD-ROM, a magnetic tape, a floppy disk, an optical data storage device, etc.

It is understandable that, the term "multiple" mentioned in the disclosure refers to two or more than two. The term "and/or" describes the relationship of association objects, indicating that there may exist three relationships. For example, "A and/or B" means only A, only B or both A and B. The character "/" generally means objects before and after this character is a kind of "or" relationship.

After considering the specification and practicing the disclosure herein, those skilled in the art will easily achieve other implementations. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It is understandable that the disclosure is not limited to the precise structure described above and shown in the drawings, and various modifications and changes may be made without departing from its scope. The scope of the disclosure is only limited by the appended claims. The scope of the disclosure is only limited by the appended claims.

What is claimed is:

1. A method for transmitting information, comprising:
   transmitting a broadcast message in a manner of out-of-band communication by a first power transmitting device for wireless charging;
   wherein the broadcast message is configured to indicate related information of the first power transmitting device to a power receiving device and/or other power transmitting devices, and the broadcast message includes discontinuous transmission (DTX) information, that indicates a DTX period and a transmission duration corresponding to the out-of-band communication.

2. The method of claim 1, wherein, the broadcast message further comprises:
   a device identifier of the first power transmitting device; and,
   a device identifier of at least one target power receiving device, the target power receiving device referring to a power receiving device that is being charged by the first power transmitting device.

3. The method of claim 2, wherein, the broadcast message further comprises: encrypted authentication information corresponding to the target power receiving device, the encrypted authentication information being configured to perform an identity authentication on the target power receiving device.

4. The method of claim 2, wherein, the broadcast message further comprises charging state information corresponding to the target power receiving device, the charging state information being with a timestamp.

5. The method of claim 1, wherein, transmitting the broadcast message in the manner of out-of-band communication by the first power transmitting device comprises:
   periodically transmitting the broadcast message in the manner of out-of-band communication by the first power transmitting device;
   and/or,
   transmitting the broadcast message in the manner of out-of-band communication by the first power transmitting device in response to detecting a target event.

6. The method of claim 1, further comprising:
   performing an authentication on a second power transmitting device by the first power transmitting device, and adding the second power transmitting device to a trusted group by the first power transmitting device after the authentication of the second power transmitting device passes;
   wherein the trust group comprises at least one power transmitting device.

7. The method of claim 6, further comprising:
   transmitting broadcast configuration information to a power transmitting device in the trusted group by the first power transmitting device, the broadcast configuration information being configured to indicate a moment of transmitting the broadcast message.

8. The method of claim 6, further comprising:
removing a third power transmitting device from the trusted group by the first power transmitting device after detecting the third power transmitting device in the trusted group is powered down.

9. The method of claim 8, further comprising:
receiving, by the first power transmitting device, a group-joining request transmitted after the third power transmitting device is powered on again;
performing an authentication on the third power transmitting device by the first power transmitting device; and
adding the third power transmitting device to the trusted group again by the first power transmitting device after the authentication of the third power transmitting device passes.

10. A device for transmitting information, applied to a first power transmitting device, the first power transmitting device being a device for wireless charging, wherein the device comprises:
a processor;
a memory for storing instructions executable by the processor;
wherein, the processor is configured to:
transmit a broadcast message in a manner of out-of-band communication;
wherein the broadcast message is configured to indicate related information of a first power transmitting device to a power receiving device and/or other power transmitting devices, and the broadcast message includes discontinuous transmission (DTX) information that indicates a DTX period and a transmission duration corresponding to the out-of-band communication.

11. The device of claim 10, wherein the processor is configured to:
periodically transmit the broadcast message in the manner of out-of-band communication;
and/or,
transmit the broadcast message in the manner of out-of-band communication in response to detecting a target event.

12. The device of claim 11, wherein the processor is further configured to:
perform an authentication on a second power transmitting device and add the second power transmitting device to a trusted group after the authentication of the second power transmitting device passes;
wherein the trust group comprises at least one power transmitting device.

13. The device of claim 12, wherein the processor is further configured to:
transmit broadcast configuration information to a power transmitting device in the trusted group, the broadcast configuration information being configured to indicate a moment of transmitting the broadcast message.

14. The device of claim 12, wherein the processor is further configured to:
remove a third power transmitting device from the trusted group after detecting the third power transmitting device in the trusted group is powered down.

15. The device of claim 14, wherein the processor is further configured to:
receive a group joining request transmitted after the third power transmitting device is powered on again;
perform an authentication on the third power transmitting device; and
add the third power transmitting device to the trusted group again after the authentication of the third power transmitting device passes.

16. The device of claim 10, wherein, the broadcast message comprises:
a device identifier of the first power transmitting device; and,
a device identifier of at least one target power receiving device, the target power receiving device referring to a power receiving device that is being charged by the first power transmitting device.

17. The device of claim 16, wherein the broadcast message comprises:
encrypted authentication information corresponding to the target power receiving device, the encrypted authentication information being configured to perform an identity authentication on the target power receiving device.

18. The device of claim 16, wherein the broadcast message further comprises charging state information corresponding to the target power receiving device, the charging state information being with a timestamp.

* * * * *